United States Patent [19]

Redgrave et al.

[11] Patent Number: 5,507,083
[45] Date of Patent: Apr. 16, 1996

[54] STRETCHING BRAKE SHOE RETURN SPRINGS

[75] Inventors: Christopher Redgrave, Portage; Jay White, Galesburg, both of Mich.

[73] Assignee: Eaton Corporation, Cleveland, Ohio

[21] Appl. No.: 937,917

[22] Filed: Aug. 31, 1992

[51] Int. Cl.[6] .................................................. B23P 19/04
[52] U.S. Cl. ............................................. 29/227; 29/267
[58] Field of Search ..................... 29/227, 267; 254/131; 188/382

[56] References Cited

U.S. PATENT DOCUMENTS

| | | | |
|---|---|---|---|
| 2,489,434 | 11/1949 | Riccio | 29/227 |
| 2,811,772 | 11/1957 | Johnson | 29/227 |
| 4,063,342 | 12/1977 | Mitchell et al. | 29/227 |
| 5,003,680 | 4/1991 | Vesely et al. | 29/227 |
| 5,095,603 | 3/1992 | Carruthers et al. | 29/227 |
| 5,165,154 | 11/1992 | Miller | 29/227 |

Primary Examiner—Robert J. Oberleitner
Assistant Examiner—Kevin D. Rutherford
Attorney, Agent, or Firm—Roger A. Johnston; Howard D. Gordon

[57] ABSTRACT

A generally straight elongated lever tool is insertable through the notch between the ribs in the end of a heavy duty truck brake shoe. A notch in the end of the tool engages the wire between the coils of the return spring when the tool is inserted between the shoe ribs at the end of the shoe. The tool is fulcrummed about the end of the brake actuating S-cam or roller for stretching the spring. One side of the notched end of the tool is concave or cupped to contact one of the spring coils for direct axial lift or stretch to cause the spring end hook to snap over an anchor pin up installation. The opposite side of the notched end of the tool surface is inclined for spring removal such that upon reversed insertion of the tool with the inclined surface against the spring coil and fulcrumming about the S-cam or roller, the coil is deflected laterally upon stretching of the spring to cause the end hook to clear the anchor pin upon relaxation of the spring.

1 Claim, 5 Drawing Sheets

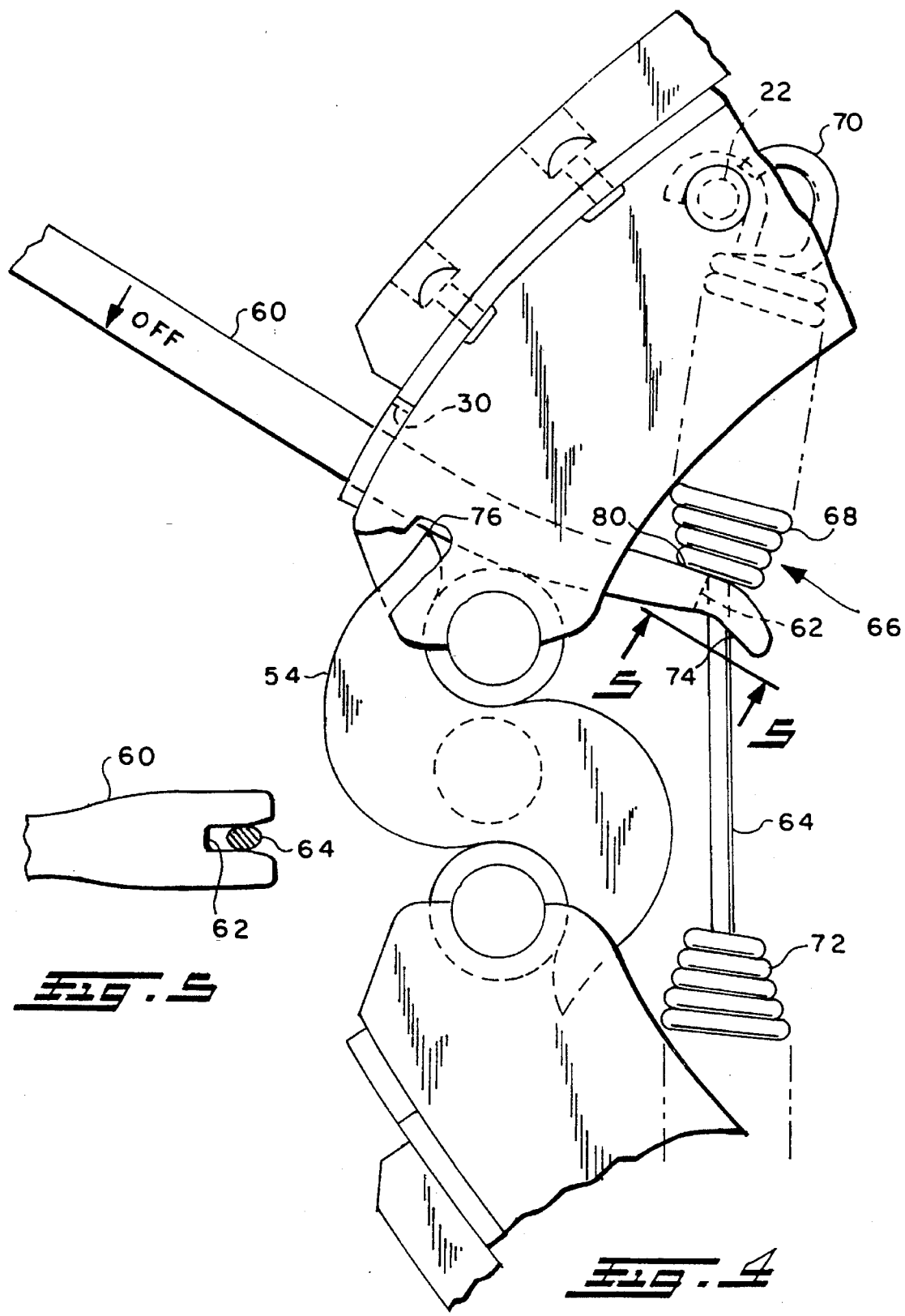

STRETCHING BRAKE SHOE RETURN SPRINGS

BACKGROUND OF THE INVENTION

The present invention relates to installation and removal of return springs for expanding shoe brakes for vehicles. The invention particularly relates to the installation and removal of hooked end dual coil type return springs employed in heavy duty truck drum brakes having dual ribbed arcuate brake shoes. Truck brakes of the aforesaid type are typically actuated by rollers provided on the ends of the shoe ribs which are contacted by an S-shaped cam which is mounted on a shaft rotated by the force of compressed air acting against a piston connected to the shaft by a suitable crank arm. Rotation of the shaft and S-shaped cam acting against the rollers spreads the brake shoes outwardly to force the brake linings attached to the shoes to frictionally engage the interior surface of the wheel drum for providing the desired braking action. The brake shoes are typically interconnected by a dual coil spring having the opposite ends thereof hooked over a pin provided between the ribs of each shoe adjacent the end contacting the S-shaped cam. The spring is stretched at assembly to provide a restraining force on the shoes away from the drum and to maintain the rollers in the end of the shoes in contact with the S-shaped cam.

In manufacture and service replacement, it has been found difficult to assemble the return spring onto the brake shoes after installation on the truck axle assembly; and, it has been found extremely difficult to provide a convenient way of stretching the springs for removal for replacement of brake shoes in field service. The stiffness of the return springs combined with the minimum clearance around the various components of the brake assembly have heretofore required complicated fixtures and tools to install the spring and to provide for removal for field service.

Thus, it has been desired to provide a low cost and convenient way or means of installing and removing brake shoe return springs employed in heavy duty truck brakes.

SUMMARY OF THE INVENTION

The present invention provides a simple tool and method for stretching brake shoe return springs employed in heavy duty truck brakes, enabling ease of assembly of the brakes during manufacture, and also easy stretching of the springs for removal and re-installation in field service. The tool comprises a generally elongated straight member having a notch formed in one end to engage the wire extending between the spaced coils of the brake return spring. An inclined surface is provided on one side of the notched end which, upon fulcrumming of the tool, the inclined surface contacts the end of one of the spring coils and cams or deflects the coil laterally as the spring is stretched and causes the hooked end of the coil to disengage from the anchor pin in the brake shoe. The opposite side of the notched end of the tool has a generally cupped or v-notched surface which, upon contact with the end of the brake spring coil in the unstretched state during assembly and fulcrumming of the member stretches the spring in a direct linear or axial direction. The axial stretching of the spring causes the hooked end to contact the anchor pin and to be cammed or deflected locally as the spring is stretched, such that the hooked end snaps over the anchor pin when the spring is stretched sufficiently by the tool.

The method of the present invention enables the stretching of a heavy duty truck brake shoe return spring by inserting the tool between the space in the end of the brake shoe between the ribs of the shoe, and fulcrumming the tool on the S-shaped cam or roller to stretch the brake spring. The present invention thus provides a low cost, simple, tool and method for installation and removal of heavy duty truck brake shoe return springs.

BRIEF DESCRIPTION OF THE DRAWINGS

FIG. 4 is a view similar to FIG. 1, showing the tool reversed and fulcrummed to cam the coil of an installed spring to remove the hooked end from the anchor pin;

FIG. 5 is a portion of a section view taken along section indicating lines 5—5 of FIG. 4; and, FIG. 6 is a view in the radial direction of the brake shoe installation of FIG. 1.

DETAILED DESCRIPTION

Figure 1:
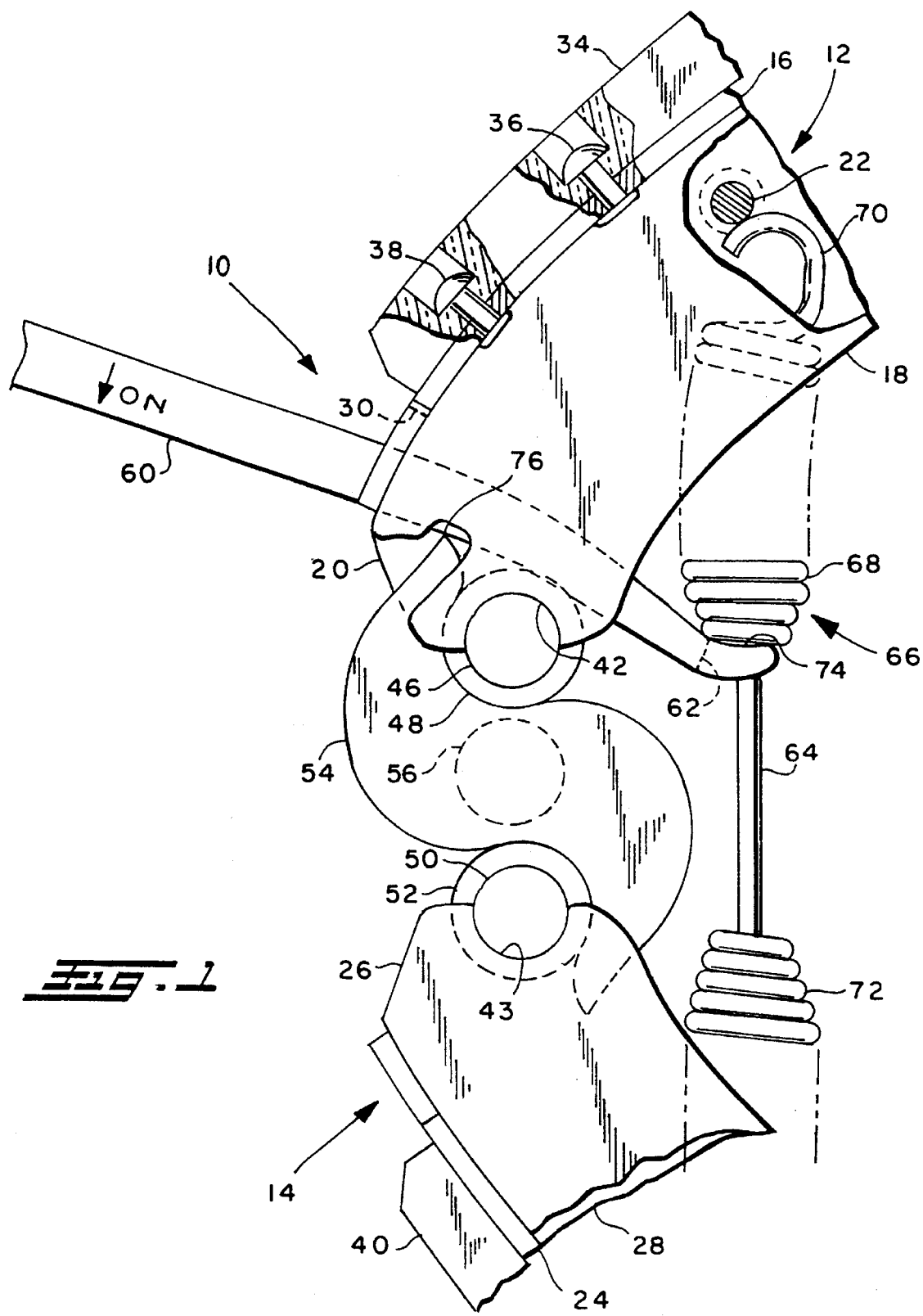
FIG. 1 is a side view of an S-cam type truck brake installation showing the invention tool fulcrummed on the S-cam or roller and initially stretching the spring coil.

Referring to FIG. 1, a brake assembly is indicated generally at 10 of the drum type employed for heavy duty trucks and has a leading brake shoe indicated generally at 12 and a trailing shoe indicated generally at 14. Shoe 12 has a curved flange 16, which has welded to the inner periphery thereof a pair of spaced ribs 18,20 which have an anchor pin 22 extending therebetween and secured therein.

Similarly, shoe 14 has a flange 24 with spaced supporting ribs 26,28 welded thereto and an unshown anchor pin extending therebetween.

Figure 6:
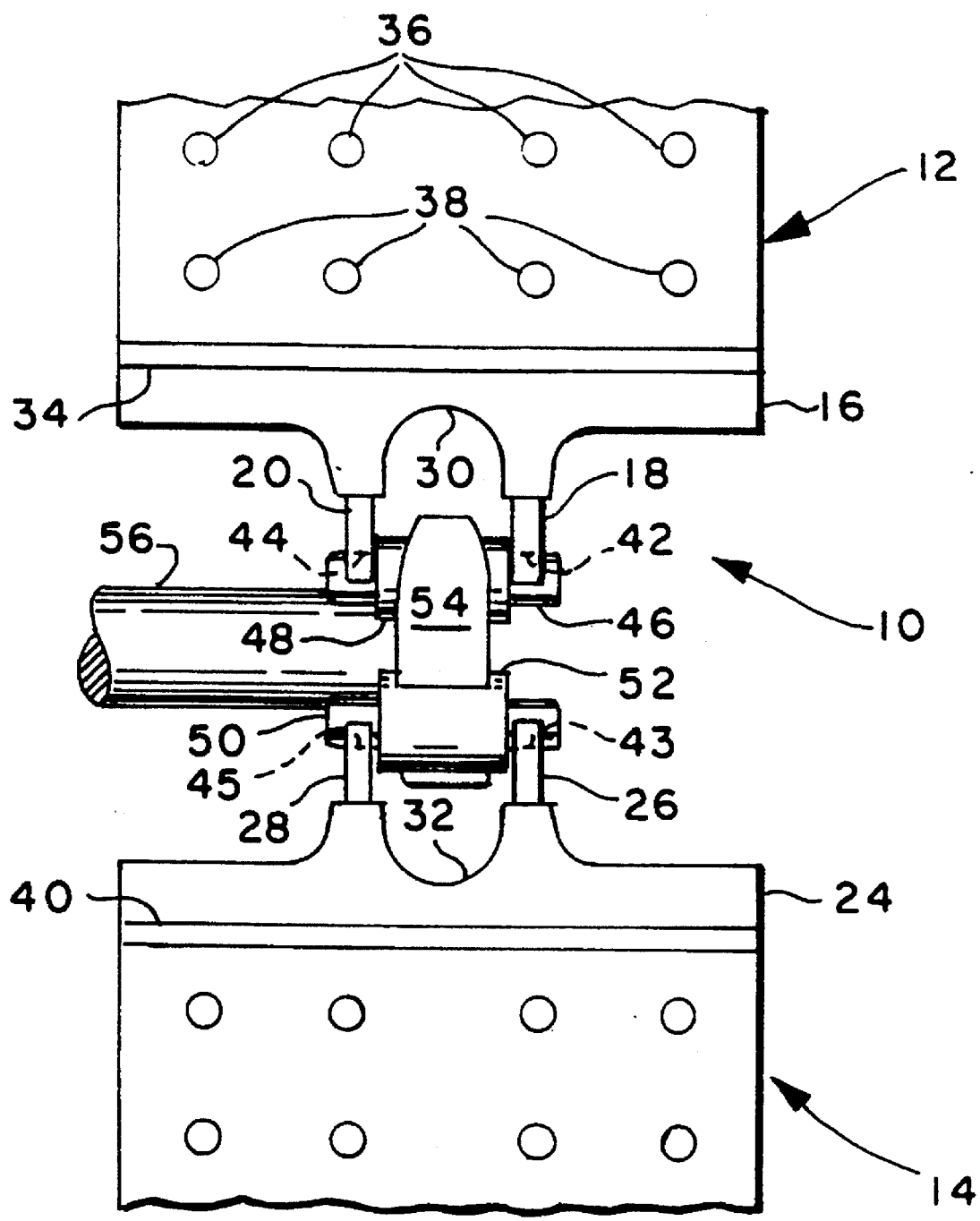

Referring to FIGS. 1 and 6, the flange 16 has the end thereof adjacent shoe 14 provided with a cutout or notch 30; and, similarly, the end of flange 24 of shoe 14 has a notch 32 formed therein during the manufacture of the shoes 12,14, which notches 30,32 figure significantly in the present invention.

Shoe 12 has a brake lining 34 formed of suitable frictional material attached to the flange 16 by rivets 36,38; and, similarly shoe 14 has a brake lining 40 attached thereto in a similar manner.

Ribs 18,20 of shoe 12 each have a recess or notch 42,44 formed respectively in the ends thereof, with a roller 46 registered therein and extending transversely between the ribs 18,20, and journalled for rotation in the cutouts 42,44. The central region 48 of the roller 46 has an enlarged diameter portion 48 disposed between the ribs 18,20. It will be understood that in a similar manner, a roller 50 is journalled in the ends of the ribs 26,28 of shoe 14; and, the roller 50 has an enlarged diameter central region 52 disposed between the ribs 26,28.

An S-shaped cam member 54 is disposed with the enlarged diameter portions 48,52 of the rollers contacting opposite sides of the cam member which is mounted on a shaft 56 in a manner well known in the art.

Referring to FIGS. 1 and 5, an elongated tool 60 preferably having a rectangular or square transverse section, has a notch 62 formed in one end thereof which notch is of sufficient width to engage a central wire portion 64 of a typical dual coil shoe return spring indicated generally at 66. The brake shoe return spring 66 has a leading coil 68 formed on one end of the wire 64, and a trailing coil 70 formed on the opposite end. Coil 68 has a hook 70 provided on the end thereof. It will be understood that trailing coil 72 formed on the opposite end of wire 64 has an unshown hook formed on the end thereof for engaging a pin or shoe 14 in a manner similar to the hook 70. The hook 70 is engaged with the pin 22 on the shoe 12 when the return spring 66 is installed in the brake assembly 10.

Referring to FIG. 1, tool 60 has been inserted through the notch 30 formed in the end of shoe flange 16; and, the end notch 62 is engaged with the wire 64 with the surface 74 of the tool engaging the end of the coil 68. The tool 60 is pivoted over the end 76 of the S-shaped cam visible in the broken away portion of rib 18 in FIG. 1. Note that the tool may also pivot about the roller 46.

In FIG. 1, lever 60 has been fulcrummed or pivoted about end 76 of the S-shaped cam to begin stretching the coil 72 for initial installation of the spring. It will be observed from FIG. 1 that the outer periphery of hook 70 on the spring coil 68 has made contact with pin 22 and has begun to deflect laterally or cam the end of the coil 68 to permit hook to extend further as the coil 72 is stretched by pivotal movement of tool 60.

Figure 2:
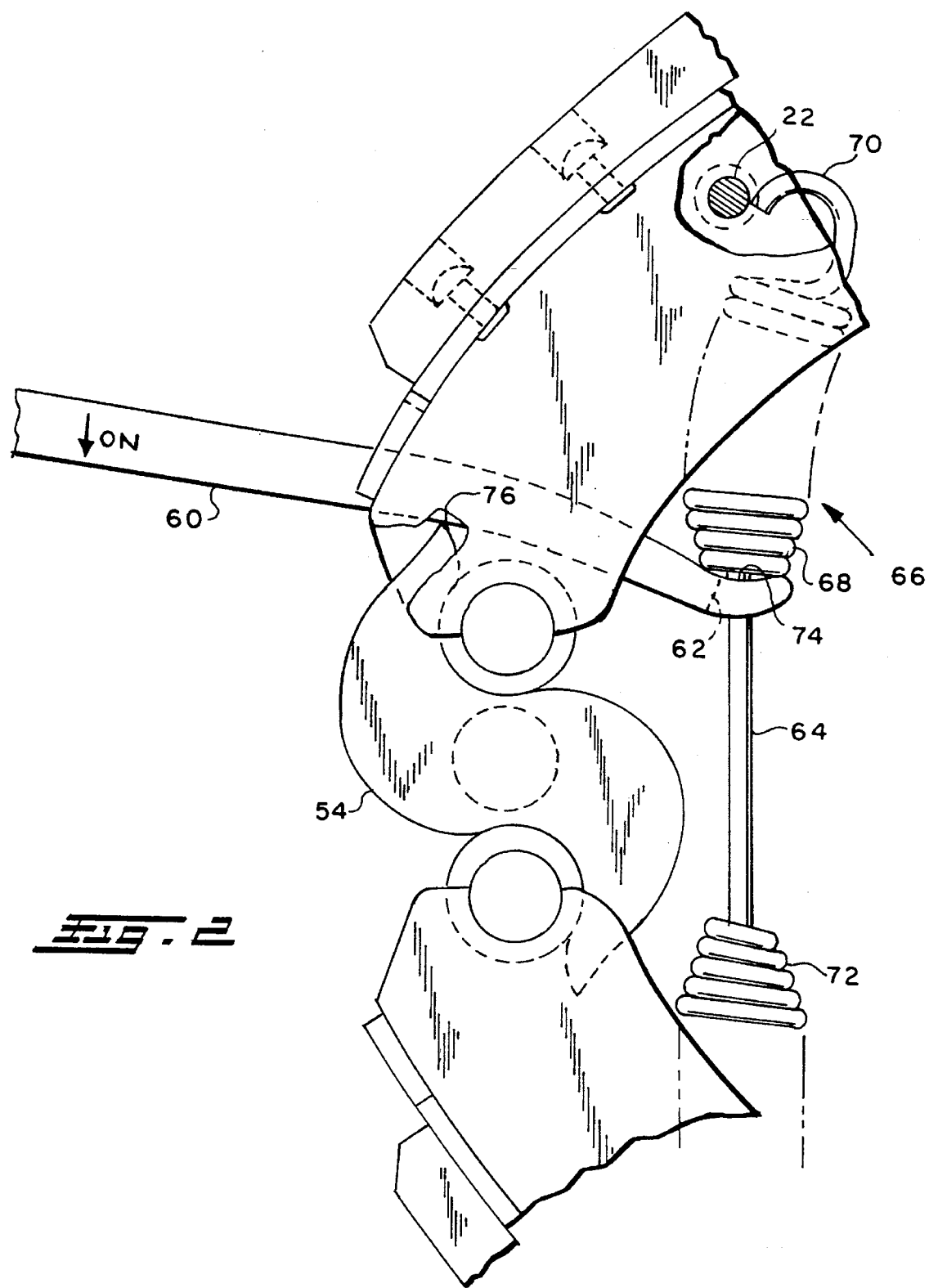
FIG. 2 is a view similar to FIG. 1 which shows the tool moved from the position in FIG. 1 to further stretch the spring coil.

Referring to FIG. 2, the tool 60 has been pivoted further from the position of FIG. 1 in a counter-clockwise direction about the end 76 of the S-cam member 54 to raise coil 68 upwardly by virtue of stretching the coil 72 until the end hook 70 of coil 68 has been further deflected laterally by pin 22 as the hook 70 is raised. It will be seen that the surface 74 of the tool 60 maintains the lower portion of the coil 68 in a generally vertical or axial arrangement, thereby providing a lateral bias on the hook 70 against the surface of the pin 22.

Figure 3:
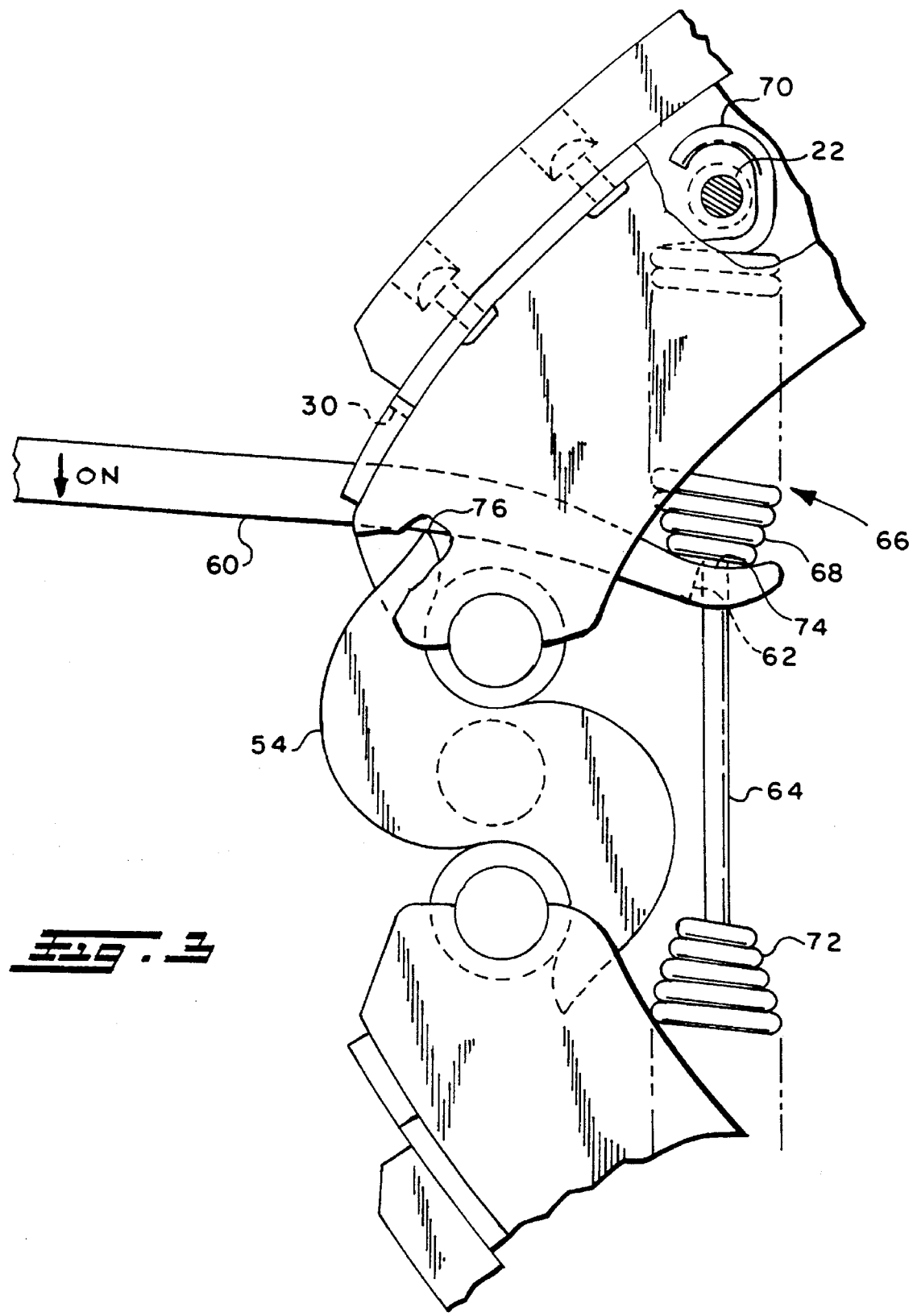
FIG. 3 is a view similar to FIG. 1, showing the tool fulcrummed to a position lifting the brake spring coil sufficiently to cause the hooked end to snap over the anchor pin.

Referring to FIG. 3, the tool 60 has been rotated further from the position of FIG. 2 in a counter-clockwise direction about the end 76 of S-cam 54 an additional amount from the position shown in FIG. 2 such that the cupped surface 74 has raised coil 68 upwardly until the hook 70 has snapped laterally into position over pin 22, from which position tool 60 may be rotated clockwise about fulcrum 76 to engage hook 70 on pin 22. Thus, the tool 60 provides ease of installation of the return spring 66 over the anchor pin 22, permitting the end hook 70 to cam its way over the anchor pin upon direct linear movement of the coil 68. It will be understood that the hook 70 is lowered directly onto the pin 22 from the position shown in FIG. 3 by clockwise rotation of tool 60 about end 76 of the S-cam; and, the tool 60 is then removed from the notch 30.

Referring to FIG. 4, the end hook 70 of spring coil 68 is shown in dashed outline in the installed position as registered on anchor pin 22. The tool 60 has been inserted in the notch 30 with the end notch 62 of the tool engaging the wire 64 of the return spring 66; and, the tool 60 has been rotated 180 degrees about its longitudinal axis such that the surface 74 faces downwardly and an inclined surface 80 provided on the opposite side of the tool from surface 74 engages the end of coil 66.

The tool in FIG. 4 has been rotated counter-clockwise by an amount sufficient to lift the coil 66, by stretching coil 72 an amount sufficient that the hook 70 is disengaged from anchor pin 22. It will be observed from FIG. 4 that the surface 80 formed on the tool is inclined a desired amount to deflect the coil 68 laterally an amount sufficient that the end of hook 70 clears the anchor pin 22, thereby permitting the coil 68 to be subsequently lowered by clockwise rotation of tool 60, and the spring returned to its unstretched condition for removal from the assembly. Once the spring has been cleared of anchor pin 22 and lowered to its unstretched condition, tool 60 may be removed from the notch 30.

The present invention thus provides a unique tool having a notched end with a cup on one side thereof for engaging the coil of a brake return spring and lifting the spring axially upon fulcrumming of the tool; and, the tool has an inclined surface on the opposite side thereof for reverse use of the tool for engaging the coil of the return spring to lift the coil and move the end hook of the coil laterally for disengagement from the anchor pin. The tool is insertable through a notch formed in the end of the brake shoe between the ribs; and, the tool is conveniently fulcrummed on the end of the S-shaped cam member or roller rotatable for expanding the shoes in service such that the tool may be readily inserted in an assembled brake, the spring installed or removed, and the tool disengaged and removed.

Although the invention has hereinabove been described with respect to the illustrated embodiments, it will be understood that the invention is capable of modification and variation, and is limited only by the following claims.

We claim:

1. A tool for stretching coil type return springs employed in expanding shoe brakes comprising:
   (a) an elongated generally straight member having a notch formed in one end thereof for engaging an end coil of a return spring with one side of said member at said notched end having a surface inclined with respect to the direction of elongation such that said surface, upon contacting one end of an installed spring coil and fulcrumming of said member, is operative to deflect said coil laterally for effecting unhooking of one end of said spring from the brake shoe; and,
   (b) said notched end has a side thereof opposite said inclined surface generally concave or cupped such that upon contact with one end coil of an unstretched return spring and fulcrumming said member to stretch said spring, said coil is moved directly axially for facilitating hooking one end thereof.

* * * * *